(12) United States Patent
Heink et al.

(10) Patent No.: US 7,369,568 B2
(45) Date of Patent: May 6, 2008

(54) ATM-PORT WITH INTEGRATED ETHERNET SWITCH INTERFACE

(75) Inventors: Matthias Heink, Munich (DE); Andreas Foglar, Munich (DE); Raimar Thudt, Munich (DE); Friedrich Geissler, Wolfratshausen (DE); Martin Erdmann, Munich (DE); Michael Gerling, Munich (DE); Franz-Josef Schaefer, Kempen (DE)

(73) Assignee: Infineon Technologies AG, Munich (DE)

( * ) Notice: Subject to any disclaimer, the term of this patent is extended or adjusted under 35 U.S.C. 154(b) by 961 days.

(21) Appl. No.: 10/265,177

(22) Filed: Oct. 4, 2002

(65) Prior Publication Data

US 2003/0174729 A1    Sep. 18, 2003

(30) Foreign Application Priority Data

Mar. 1, 2002    (WO) .................. PCT/EP02/02247

(51) Int. Cl.
*H04J 3/16*    (2006.01)
*H04L 12/28*   (2006.01)
*G06F 15/16*   (2006.01)

(52) U.S. Cl. .................. 370/466; 370/395; 709/249

(58) Field of Classification Search .................. None
See application file for complete search history.

(56) References Cited

U.S. PATENT DOCUMENTS 5,946,313 A * 8/1999 Allan et al. .................. 370/397

| | | | |
|---|---|---|---|
| 6,111,880 A | 8/2000 | Rusu et al. | 370/395 |
| 6,249,528 B1* | 6/2001 | Kothary | 370/466 |
| 6,778,525 B1* | 8/2004 | Baum et al. | 370/351 |
| 2001/0002909 A1 | 6/2001 | Iwamoto | |
| 2002/0174251 A1* | 11/2002 | Lasserre | 709/249 |
| 2004/0131064 A1* | 7/2004 | Burwell et al. | 370/397 |

FOREIGN PATENT DOCUMENTS

| WO | 02/095607 | 11/2000 |
|---|---|---|
| WO | WO 01/31969 | 5/2001 |
| WO | 02/15494 | 2/2002 |

OTHER PUBLICATIONS

Yuan et al., "Protocol and Implementation of ATM Over Ethernet" *IEEE*, pp. 236-241, (2000).

* cited by examiner

*Primary Examiner*—Huy D. Vu
*Assistant Examiner*—Clemence Han
(74) *Attorney, Agent, or Firm*—Fish & Richardson P.C.

(57) ABSTRACT

An ATM-port module for an ATM-node having an Ethernet switch includes an ATM-controller; and an Ethernet-switch interface connecting it to the Ethernet switch. The switch has an Ethernet encapsulating-unit for encapsulating ATM cells processes by the ATM-controller into packets for transmission to the switch, and an Ethernet decapsulating-unit for extracting ATM cells from packets received from the switch. The module further includes a segmentation-and-reassembly unit; and a buffering-and-scheduling unit. The buffering-and-scheduling unit provides a processed enlarged-ATM-cell to the encapsulating-unit when an indication flag indicates that an ATM port is a destination port of the enlarged ATM-cell; and a processed enlarged-ATM-cell to the segmentation-and-reassembly unit when an indication flag indicates that an Ethernet port is the enlarged ATM-cell's destination port.

20 Claims, 17 Drawing Sheets

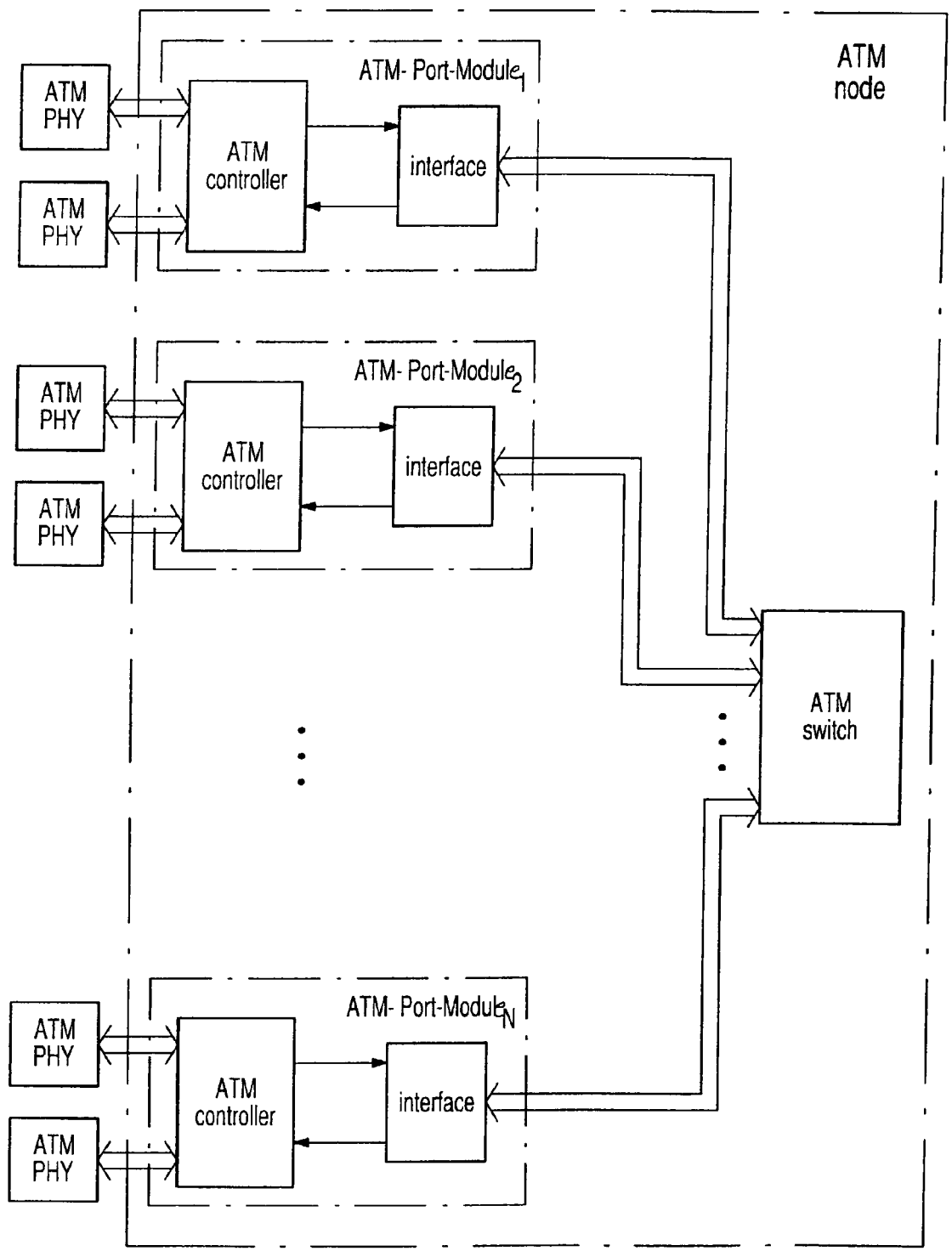
FIG. 1 (State of the Art)

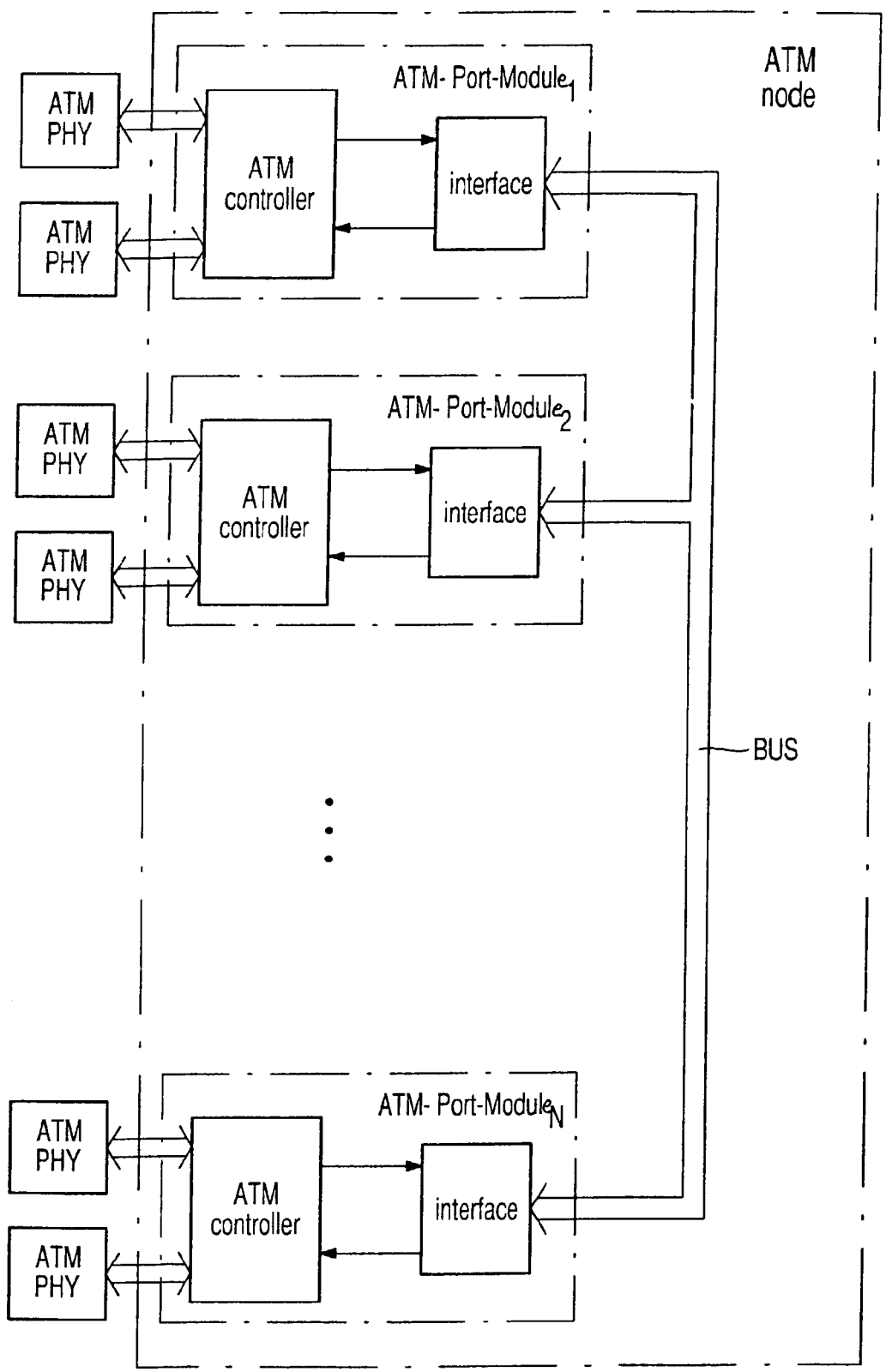
FIG. 2 (State of the Art)

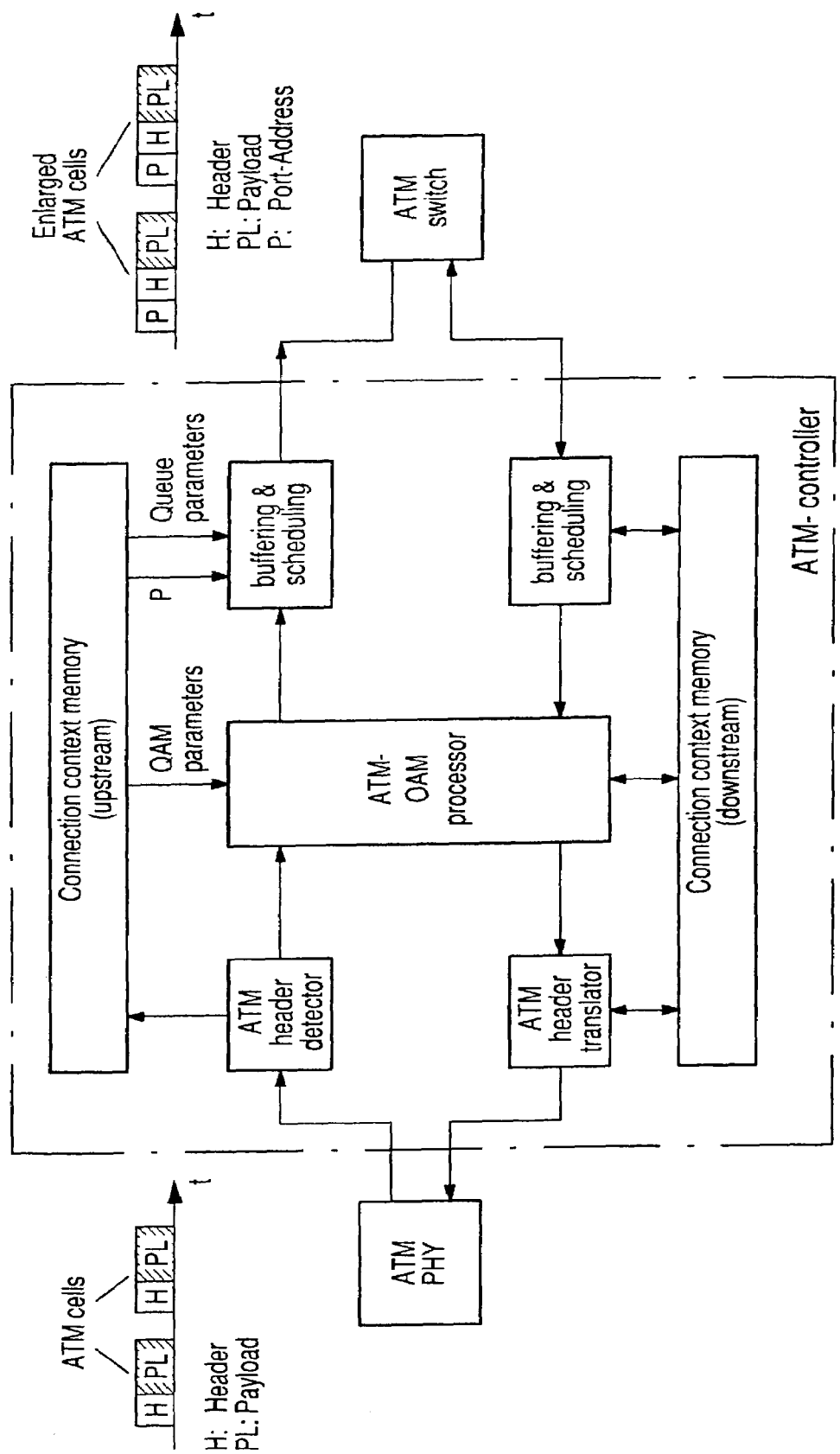
FIG. 3 (State of the Art)

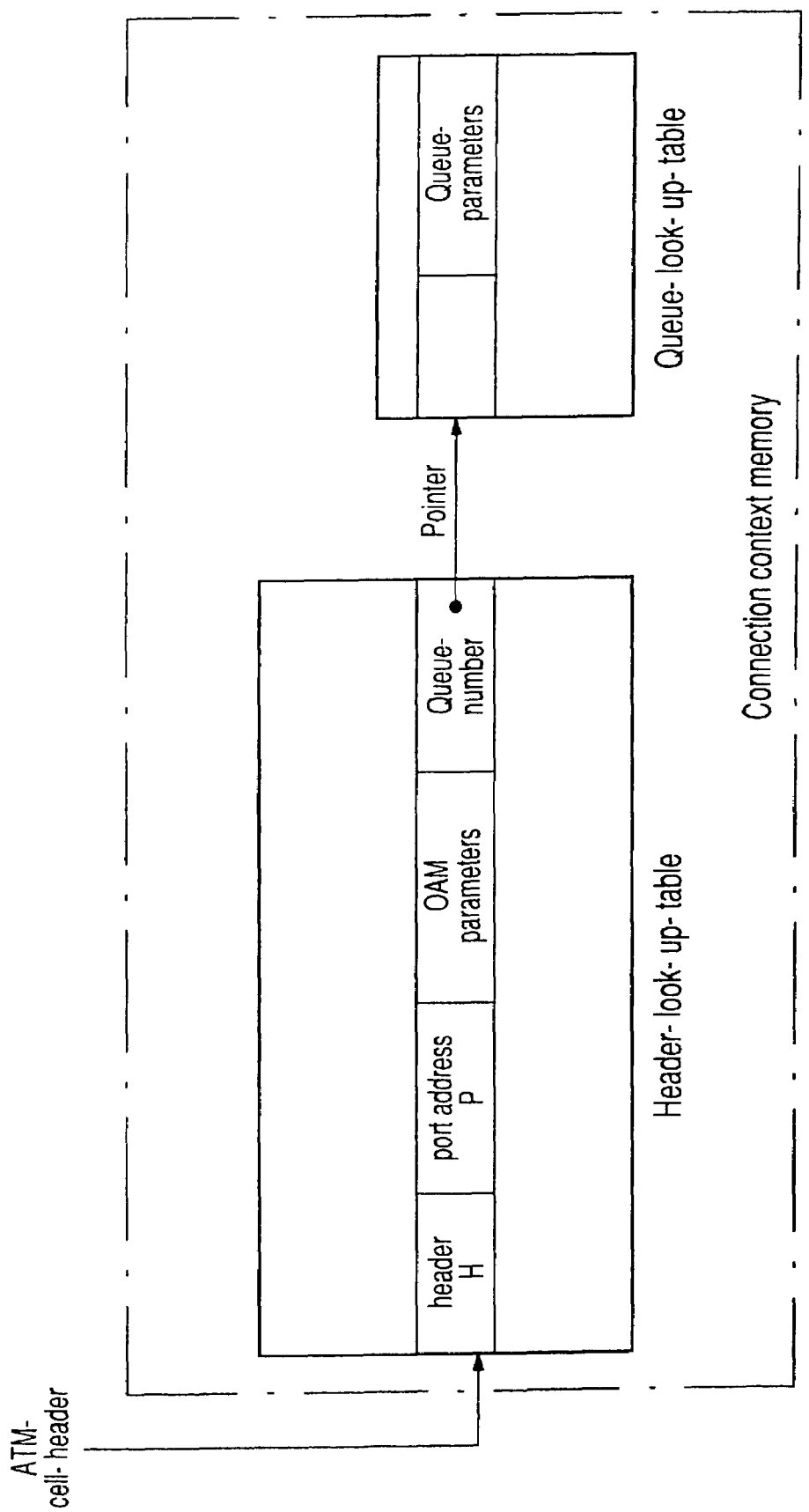
FIG. 4 (State of the Art)

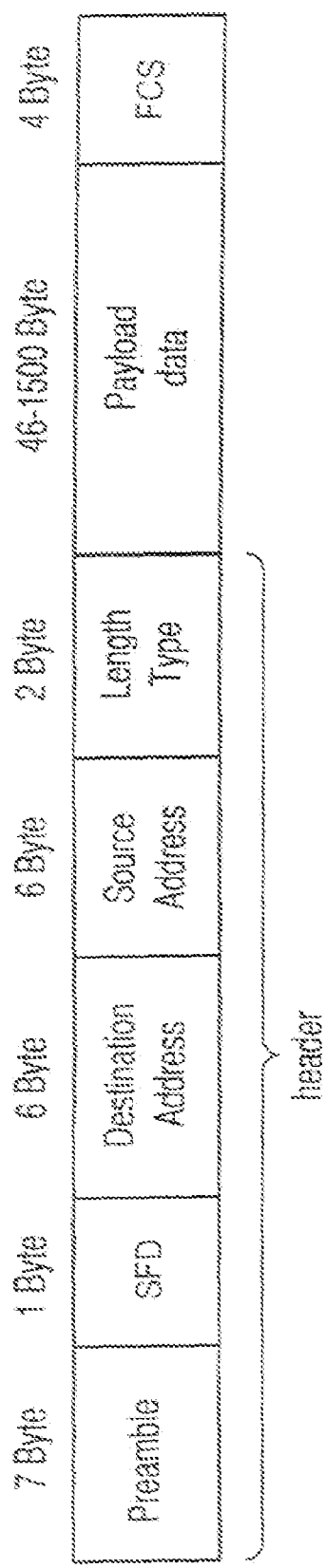
FIG. 5d (State of the Art)

ATM-PORT WITH INTEGRATED ETHERNET SWITCH INTERFACE

RELATED APPLICATIONS

This application claims the benefit of the Mar. 1, 2002 priority date of PCT application PCT/EP02/02247, the contents of which are herein incorporated by reference.

FIELD OF INVENTION

The invention refers to an ATM-Port-Module with an integrated Ethernet switch interface for connecting the ATM-Port-Module to an Ethernet switch core module.

BACKGROUND

ATM (Asynchronous Transfer Mode) is a packet switched and more specifically, cell switched broadband network technology. ATM forms the core of a broadband ISDN architecture that extends the digital transmission capabilities defined by ISDN for low rate voice, to voice and multimedia transmissions on the same lines.

ATM is a real time architecture that can provide very high bandwidth. Implementations currently operate at the speeds ranging from a special slow speed versions of 128 kbps up to 622.08 Mbps. Speeds as high as 2.488 Gbps will eventually be supported.

Because of the very high bandwidth, the ability to transmit multiple media data ATM can serve as an high speed architecture for both local area networks (LAN) and wide area networks (WAN).

ATM and AAL are associated with layer 2 of the OSI reference model.

The ATM layer is the service independent layer at which outgoing ATM cell headers and trailers are created, virtual channels and signal paths are defined and given unique identifiers, and cells are multiplexed or demultiplexed. The ATM layer creates the cells, then uses a physical layer to transmit them. Headers in received ATM cells are verified at this layer. Headers and trailers are also removed from incoming cells, the ATM layer is also responsible for traffic management.

The topmost layer is the AAL-layer (ATM Adaptation layer). The AAL-layer is service-dependent. It provides the necessary protocol translation between ATM and other communication services such as voice, video or data communication services involved in a transmission.

The AAL-layer has two sub-layers, i.e. the conversion sub-layer and the SAR-sub-layer. The conversion sub-layer provides the interface for the various services. The SAR-sub-layer (SAR: Segmentation and Re-assembly) is the sub-layer that packages variable size packages into fixed size cells at the transmitting end and re-packages the cells at the receiving end. The SAR-sub-layer is also responsible for finding and dealing with cells that are out of order or lost.

FIG. 1 shows an ATM node according to the state-of-the-art. The ATM node comprises several ATM-Port-Modules each comprising an ATM-controller unit. The ATM-controllers are linked via interfaces to an ATM switch device. Each ATM-Port-Module supports at least one physical transmission line (PHY). For XDSL up to 128 PHYs can be connected to the ATM-Port-Module. The ATM node can include cross connect without switching as well as true switching with signaling.

The number of ATM-Port-Modules within the ATM node is at least two. In a typical ATM node, several ATM-Port-Modules are provided. For instance, in a hub-system, up to 8 ATM-Port-Modules, in back-plane systems, up to 32 ATM-Port-Modules, and in large rack-based systems up to 256 ATM-Port-Modules are provided.

With the ATM-node according to the state-of-the-art as shown in FIG. 1, several problems arise. The production volume of the component for the ATM switch that forms the core module of the ATM node is much smaller than the production volume of the components for the ATM-Port-Modules by at least a factor of 10. A further significant problem is that there is no technical standard existent for the interconnection between the core module, i.e. and the ATM switch and the ATM-Port-Modules. In particular the ATM node according to the state-of-the-art as shown in FIG. 1 cannot be connected to an Ethernet network.

To overcome the production volume problem, an ATM node as shown in FIG. 2 has been developed by Transwitch (www.transwitch.com). This ATM node according to the state-of-the-art, as shown in FIG. 2, connects the ATM-Port-Modules of the ATM node via a passive cell bus. This proprietary back-plane bus or cell bus replaces the ATM switch within the ATM node. A disadvantage of the ATM node shown in FIG. 2 is that the cell bus limits the data throughput. The data throughput is limited by the cell bus of Transwitch to the maximum of about 1 Gbps. A further drawback is that the ATM node fails if one transmission line of the parallel cell bus is disconnected. A further major disadvantage is that the back-plane cell bus is also proprietary and not compatible to standard Ethernet systems.

FIG. 3 shows an ATM controller within an ATM-Port-Module according to the state-of-the-art. The ATM-controller performs the standard ATM-layer functions such as header detection and header translation. An ATM-OAM-processor performs OAM-functions (OAM: operation and maintenance) and traffic management functions in both directions. The ATM-header detector recognizes valid ATM-cell headers, i.e. by using predefined VPI/VCI-values (VPI: virtual path identifier; VCI: virtual channel identifier). Only a small subset of the large number of possible VPI/VCI-combinations are valid in a typical ATM-Port-Module. An ATM-header translation is performed before the ATM-cell leaves the ATM-controller. OAM-functions performed by the ATM-OAM-processors are i.e. loop back, performance monitoring and alarming. The OAM-functions are defined in the ITU-standard I. 610.

Traffic management functions are buffering of data streams and optionally policing, scheduling and traffic shaping. The traffic management functions of the ATM-controller are performed by buffering and scheduling devices. Policing is used to control the incoming cell streams. During the scheduling, an ensemble of connections with individual traffic parameters, either per connection or per group of connections, are selected and given opportunity to emit cells. Traffic-parameters are e.g. priority, minimum throughput, maximum burst size, cell loss rate. The traffic-parameters are assigned according to the information transported, e.g. real time voice, video data or non-real time data. Cell streams with the same destination are combined by the schedulers. In the signal path direction towards the ATM switch one scheduling device is assigned for each ATM-Port-Module, and in the opposite signal path direction at least one scheduler is assigned for each ATM-physical transmission line.

The ATM-OAM-processor and the buffering and scheduling devices are connected to a connection context memory within the ATM-controller. FIG. 4 shows a connection context memory according to the state-of-the-art. The ATM-header detector detects the header of an incoming ATM-cell and addresses an entry in a header lookup table. In the header lookup table, the outgoing header, port address P, OAM-parameter and a queue number Q are stored. The queue number Q serves as a pointer to a memory entry in the queue lookup table in which queue parameters are stored. The ATM switch receives enlarged ATM-cells with a prepended port address P that specifies the output port of the ATM-node.

FIG. 5a shows the data format of an ATM-cell having an ATM-header comprising 5 bytes and an ATM-payload comprising 48 bytes. FIG. 5b shows the data structure of an enlarged ATM-cell comprising a prepended port address P that indicates the destination port address in the node.

FIG. 5c shows the content of an ATM-cell according to the state-of-the-art. The ATM-cell consists of a 5 octet header in a 48 octet data or payload, section. Most of the bits in the ATM-header are used for virtual path and channel identification. The CLP (CLP: cell loss priority) bit indicates whether the cell can be discarded if the network traffic volume makes this advisable.

FIG. 5d shows the data structure of an Ethernet packet according to IEEE 802.3. The IEEE 802.3 standard is currently the most widely used architecture for local area networks (LAN). The frame sizes of the Ethernet packet shown in FIG. 5d varies between 64 and 1,518 data bytes. The Ethernet standard supports a wide range of transceiver types for communication over a given type of cabling. The most popular transceiver types are 10BASE5 (thick coax), 10BASE-T (two pair category 3,4,5 UTP [=unshielded twisted pair]), 100BASE-TX(two pair category 5 UTP), 100BASE-FX (dual multimode fiber), 1000BASE-T (four pairs category 5 UTP), 1000BASE-X (two optical fibers). The Ethernet frame comprises a preamble (7 bytes), a Start Frame Delimiter (SFD, 1 byte), the addresses of the frame's source and destination (each 6 bytes), a length or type field to indicate the length or protocol type of the following data field, a data field including padding if required (46-1500 bytes) and a Frame Check Sequence (FCS, 4 bytes) containing a cyclic redundant check (CRC) value to detect errors in the frame. Interpreting the type/length field as length or type distinguishes the two main types of Ethernet packets, i.e. Ethernet 2 and 802.3 based packets.

The payload of the Ethernet packet comprises 46-1,500 bytes of payload data. The payload data components must be at least 46 bytes and may include padding bytes.

As outlined above the ATM-nodes according to the state-of-the-art, as shown in FIGS. 1 and 2, are not compatible with Ethernet.

SUMMARY

Accordingly it is the object of the present invention to provide an ATM-Port-Module for an ATM-node device that is compatible to Ethernet.

The present invention provides an ATM-Port-Module for an ATM-node device having an ATM-controller for processing ATM-cells transmitted via transmission lines, wherein the ATM-Port-Module comprises an Ethernet switch interface connecting the ATM-Port-Module to an Ethernet switch core module of the ATM-node device.

The ATM-Port-Module according to the present invention provides higher data transmission rates since the payload of many ATM-cells can be packed into one Ethernet packet. This leads to less overhead when processing header data.

A further advantage resides in that the Ethernet switch core module is scalable.

In a preferred embodiment of the ATM-Port-Module according to the present invention, the Ethernet switch interface comprises an Ethernet encapsulating unit for encapsulating ATM-cells processed by the ATM-controller into Ethernet packets for transmission to the Ethernet switch core module and an Ethernet decapsulating unit for extracting ATM-cells from Ethernet packets received from the Ethernet switch core module.

The ATM-controller of each ATM-Port-Module comprises preferably an ATM-to-Ethernet signal path and an Ethernet-to-ATM-signal path.

In a preferred embodiment of the ATM-Port-Module according to the present invention, the ATM-controller comprises a connection context memory for storing a header lookup table and a queue lookup table.

In the header lookup table of the connection context memory the port address P of a destination port of the ATM-node device, OAM-parameters, and the queue number Q are stored.

In a preferred embodiment of the ATM-Port-Module according to the present invention each queue number Q is a pointer to a corresponding memory entry in the queue lookup table.

In a preferred embodiment of the ATM-Port-Module according to the present invention, for each queue number Q, corresponding queue parameters and an indication flag are stored in the queue lookup table of the connection context memory.

The indication flag (VC-MERGE-SELECT) indicates whether the destination port of the received ATM-cell is an ATM-Port connected to the ATM-Port-Module within the ATM-node device or an Ethernet port of the Ethernet switch core module within the ATM-node device.

The ATM-controller of the ATM-Port-Module according to the present invention comprises, in a preferred embodiment, an ATM-header detector unit for detecting headers of ATM-cells received via a transmission line, an ATM-OAM-processor for performing operation and maintenance functions depending on OAM-parameters read from the connection context memory, a buffering and scheduling unit for buffering and scheduling the processed ATM-cells and for generating enlarged ATM-cells each including a port address P of the ATM-node device, wherein the port address P is read from the connection context memory.

In a preferred embodiment the ATM-Port-Module according to the present invention, the Ethernet-to-ATM signal path of the ATM-controller comprises a buffering and scheduling unit for buffering and scheduling ATM-cells received from the Ethernet switch interface, the ATM-OAM-processor for performing operation and maintenance functions depending on OAM-parameters read from the connection context memory, and an ATM-header translator.

In a further preferred embodiment of the ATM-Port-Module according to the present invention, the buffering and scheduling unit of the ATM-controller outputs the processed enlarged ATM-cells to the Ethernet encapsulating unit when the indication flag (VC-MERGE-SELECT) indicates an ATM-Port as the destination port, and outputs the processed enlarged ATM-cells to a Segmentation and Re-assembly unit (SAR) when the indication flag (VC-MERGE-SELECT) indicates an Ethernet-Port as the destination port.

In a preferred embodiment the ATM-port module according to the present invention, the Segmentation and Re-assembly unit (SAR) discards the ATM-headers of the enlarged ATM-cells and forwards the payload of the enlarged ATM-cells to an Ethernet packet generator which generates an Ethernet packet containing at least one discarded ATM-cell as payload.

In a preferred embodiment of the ATM-Port-Module according to the present invention, the Ethernet packet generator generates the Ethernet packet depending on interworking type data read from the connection context memory.

BRIEF DESCRIPTION OF THE FIGURES

In the following, preferred embodiments of the ATM-Port-Module according to the present invention are described with respect to the enclosed figures.

FIG. 1 shows an ATM-node according to the state-of-the-art;

FIG. 2 shows a further ATM-node according to the state-of the-art;

FIG. 3 shows a conventional ATM-controller;

FIG. 4 shows a connection context memory according to the state-of-the-art;

FIG. 5d shows the data structure of a conventional Ethernet packet according to the state-of-the-art;

DETAILED DESCRIPTION

Figure 6:
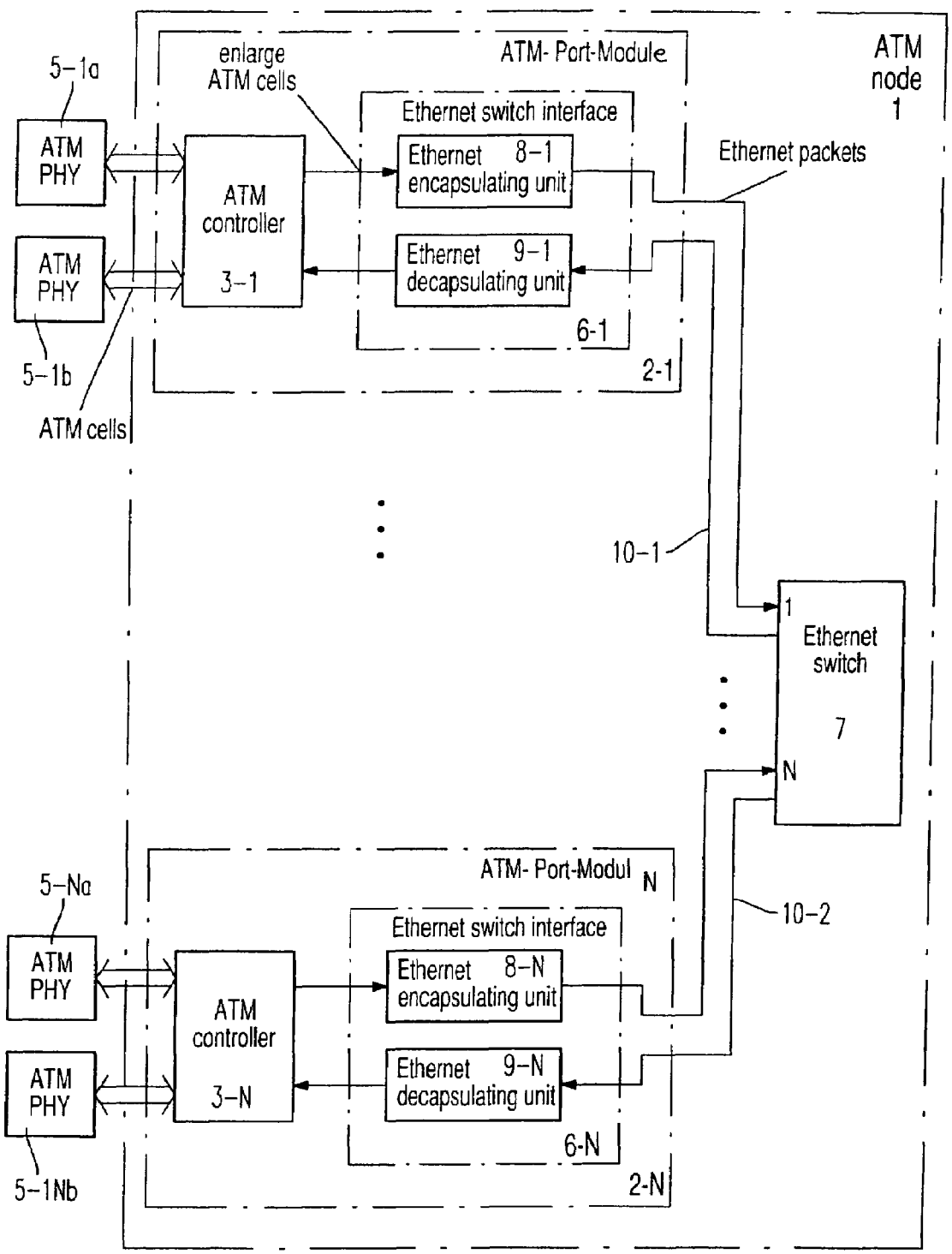
FIG. 6 is a block diagram of an ATM-node according to the present invention.

FIG. 6 shows an ATM-node 1 comprising several ATM-Port-Modules 2-1 to 2-N according to the present invention. Each ATM-Port-Module 2 within the ATM-node 1 comprises an ATM-controller 3 for processing ATM-cells transmitted via physical ATM-transmission line 5. The ATM-Port-Module 2 comprises an Ethernet switch interface 6 connecting the ATM-Port-Module 2 to an Ethernet switch core module 7 of the ATM-node device 1. Each Ethernet switch interface 6 comprises an Ethernet encapsulating unit 8 for encapsulating ATM-cells processed by the ATM-controller 3 into Ethernet packets for transmission to the Ethernet switch core module 7, and an Ethernet decapsulating unit 9 for extracting ATM-cells from the Ethernet packets received from the Ethernet switch core module 7.

Figure 5A:
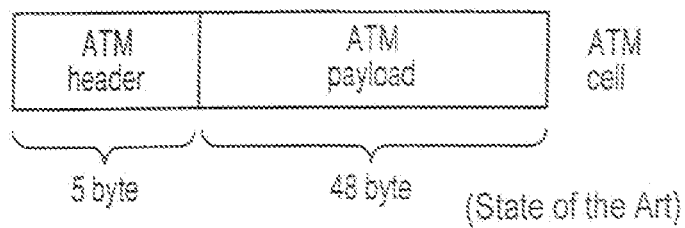
FIG. 5a shows a data format of a conventional ATM-cell.

While the external ports 5 of the ATM-node 1 have all ATM-interfaces, the internal links between the ATM-Port-Modules 2 and the Ethernet switch 7 transport standard Ethernet packets as shown in FIG. 5d. Each ATM-Port-Module 2-i has a unique Ethernet MAC-address as is usual in Ethernet networks. The Ethernet switch 7 forwards the Ethernet packets according to their destination MAC-address (DMAC). The destination MAC address is known to the Ethernet switch 7 either by configuration or by the self-learning mechanism defined in IEEE 802.1D standard.

The ATM-controller 3 within each ATM-Port-Module 2 performs standard ATM-layer functions such as header detection and translation, operation and maintenance functions, and traffic management functions.

Figure 5B:
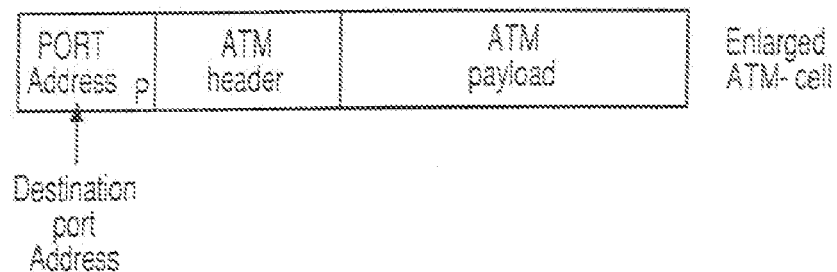
FIG. 5b shows a data format of an enlarged ATM-cell.
Figure 5C:
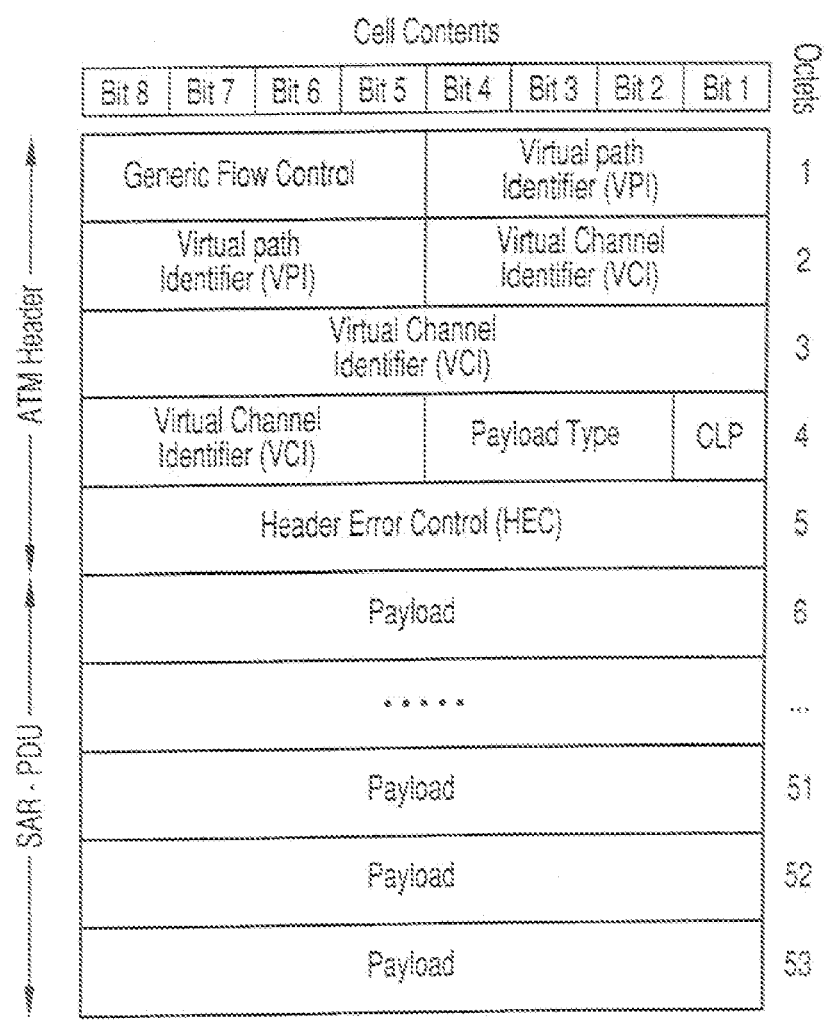
FIG. 5c shows the cell content of a conventional ATM-cell in detail.

The Ethernet switch interface 6 performs the data conversion between ATM and Ethernet. The Ethernet switch interface 6 receives, from the ATM-controller 3, enlarged ATM-cells as shown in FIG. 5b. The enlarged ATM-cells each have a prepended port address P that specifies the output port of the Ethernet switch 7. The port address P can be either the Ethernet DMAC-address of the destination ATM-Port-Module 2 or a simple binary encoded number that is converted to the DMAC-address according to a configurable table within the Ethernet switch interface 6. The other fields of the Ethernet packet header of the Ethernet packets which are exchanged between the Ethernet switch interface 6 and the Ethernet switch 7 have a fixed data pattern. The preamble, the source MAC-address (SMAC), which is the MAC-address for the respective ATM-Port-Module and the Ethertype field according to IEEE 802.3, are sent with the constant data pattern. The payload of the Ethernet packet includes at least one standard ATM-cell without the enlarged port-address P. The ATM-payload of the transmitted Ethernet packets are transparent to the Ethernet switch 7 that forwards the Ethernet packets according to the DMAC-address only. The encapsulation comprises the transparent transport of ATM over Ethernet. Only ATM-cells destined for the same ATM-Port-Module are encapsulated into the same Ethernet packet. The maximum number of ATM-cells is configurable since the maximum size of Ethernet packets is limited to 1,500 bytes and optionally a lower packet size limit is specified in order to reduce the packet delay inside the Ethernet switch 7.

Figure 7:
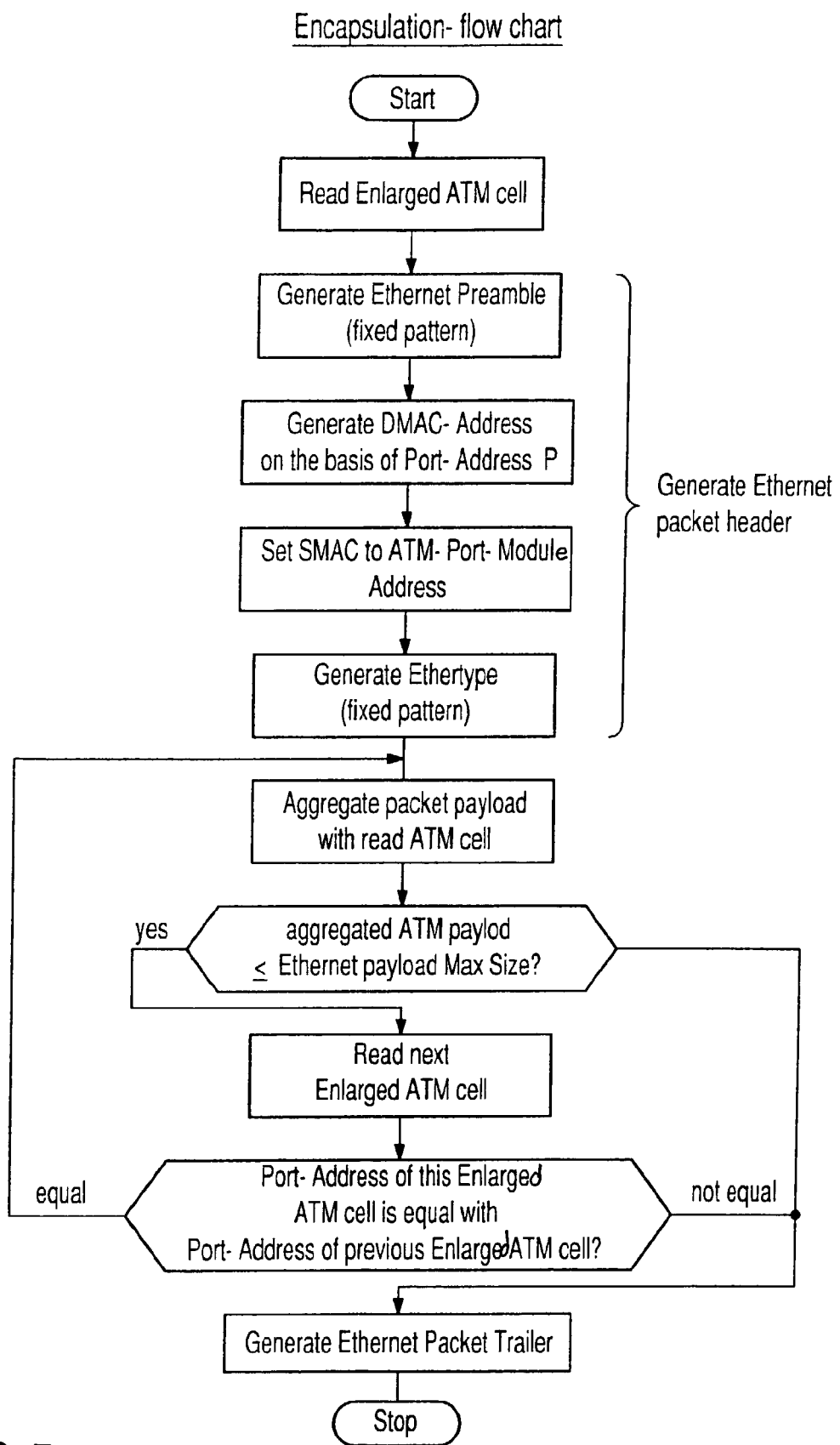
FIG. 7 is a flow chart of the encapsulation process performed by the Ethernet switch interface of the ATM-Port-Module according to the present invention.

FIG. 7 shows the encapsulation process as a flowchart.

The Ethernet encapsulating unit 8 receives enlarged ATM-cells from the ATM-controller 3. The encapsulating unit 8 generates the Ethernet packet preamble, which consists of a fixed data pattern.

On the basis of the port-address of the received enlarged ATM-cell, the Ethernet encapsulating unit 8 generates a DMAC-address of the destination ATM-Port-Module 6 within the ATM-node 1. This DMAC-address is delivered via the Port address P, either directly or coded as a binary coded number that is converted to DMAC-address via a configurable table.

In a further step, the source MAC (SMAC) of the ATM-Port-Module address 2 is set.

The Ethernet packet header is completed by generating a fixed data pattern for the Ethertype.

The ATM-payload of the received ATM-cell is aggregated. Only ATM-cells destined for the same ATM-Port-Module are put into the same Ethernet packet.

A further step checks whether the aggregated ATM-payload exceeds a maximum size for the Ethernet payload e.g. 1500 bytes. When the maximum size is not reached, the next enlarged ATM-cell is read from the ATM-controller 3.

The next step checks whether the port address P of the enlarged ATM-cell is equal to the port-address of the previous received enlarged ATM-cell. This ensures that only ATM-cells with the same ATM-Port-Module as destination are packed into the same Ethernet packet. When the port-address Pi of the last ATM-cell is equal to the port address Pi-1 of the previous enlarged ATM-cell, the content of the last ATM-cell is aggregated and the next enlarged ATM-cell is read.

In case that the port-address Pi of the last ATM-cell is not equal to the port-address Pi-1 of the previous enlarged ATM-cell, the Ethernet encapsulating unit 8 generates the trailer T for the Ethernet packet and sends the packet to the Ethernet switch 7.

Figure 8:
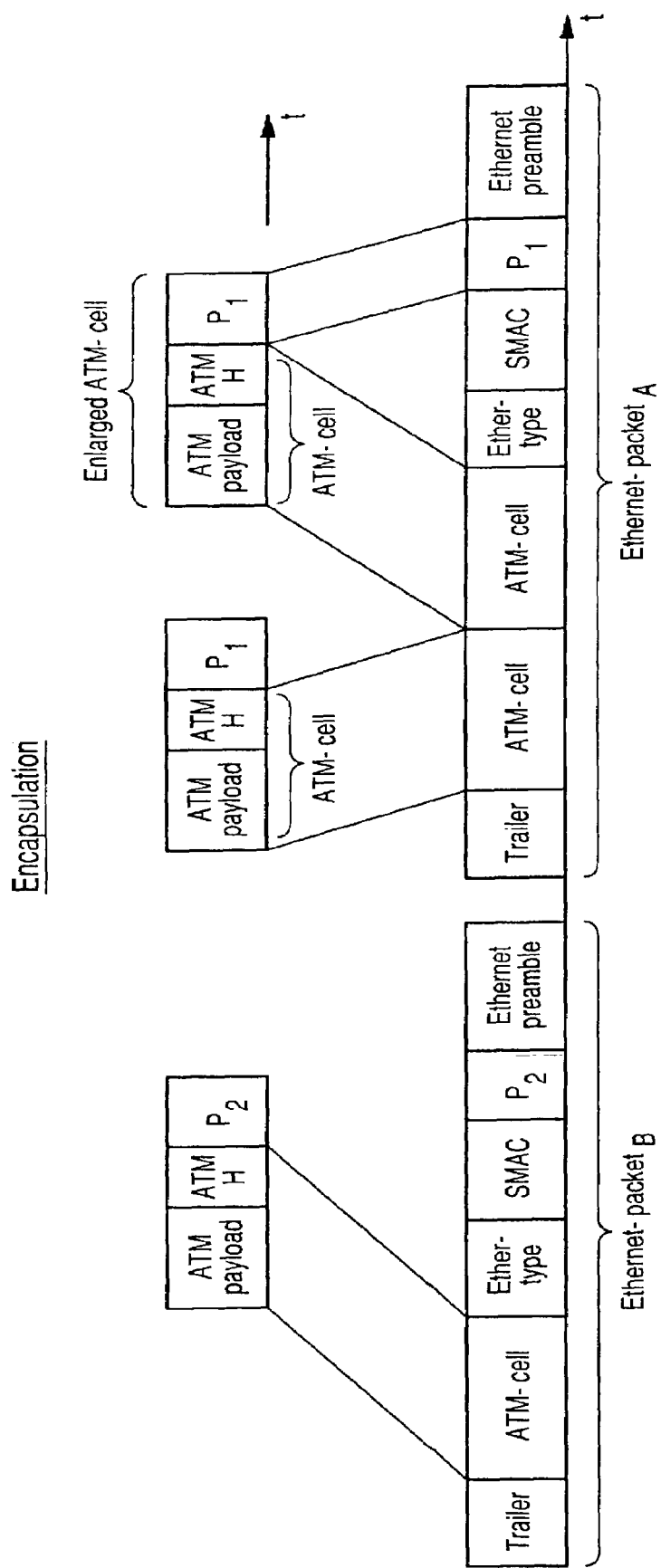
FIG. 8 shows data structures for explaining the encapsulation process according to the present invention.

FIG. 8 shows an example for the encapsulation process performed by the Ethernet encapsulating unit 8. Two enlarged ATM-cells having the same port-address P1 are packed into the first Ethernet packet A. A following enlarged ATM-cell having a different destination port-address P2 is packed into the next Ethernet packet B.

Figure 9:
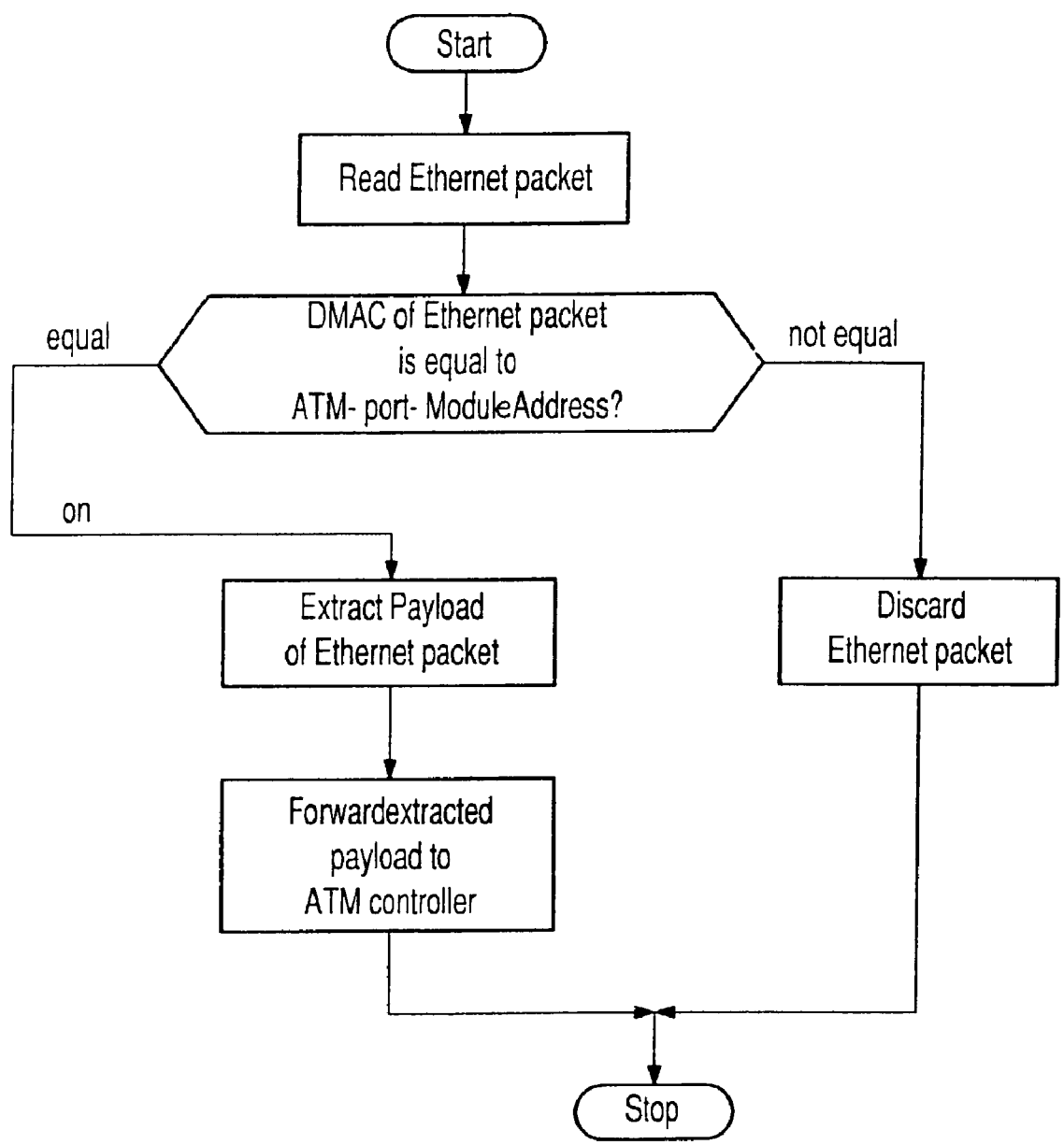
FIG. 9 is a flowchart of the decapsulation process performed by the Ethernet switch interface of the ATM-Port-Module according to the present invention.

FIG. 9 shows the flowchart of the decapsulation process performed by the Ethernet decapsulating unit 9 within the Ethernet switch interface 6. The Ethernet decapsulating unit 9 receives the Ethernet packet from the Ethernet switch 7.

A further step checks whether the destination MAC of the received Ethernet packet is equal to the MAC address of the ATM-Port-Module 2. If the addresses are not equal, a transmission error is detected and the received Ethernet packet is discarded. If both addresses are equal, the Ethernet decapsulating unit 9 extracts the payload of the received Ethernet packet.

The extracted payload is forwarded to the ATM-controller 3. The filter function is performed by comparing the DMAC-address of the incoming Ethernet packet with the local Ethernet MAC-address. Non-matching Ethernet packets are discarded. When the addresses match, the whole Ethernet packet header and payload are stripped off and only the ATM-cell payload is forwarded to the ATM-controller 3 as a consecutive sequence of ATM cells.

Several further Ethernet functions may be exploited to enhance the functionality of the total system. Multicast and broadcast functions can be realized using the predefined MAC-addresses defined by the IEEE 802 standard. The optional VLAN mechanism specified in 802.1Q may be used, in addition, or as an alternative to MAC-addresses, to specify the destination port of the Ethernet packets.

For the internal transmission links 10 shown in FIG. 6, all transmission media defined by IEEE standard can be used, specially serial links as e.g. 10/100BASE-T or 8B/10B coded Gigabit Ethernet. In a typical embodiment, the distances between ATM-Port-Module 2 and the Ethernet switch 7 are below 1 meter but also distant ATM-Port-Modules 2 may be provided in certain applications. For this purpose, either 100 meter electrical or 2 kilometer optical transmission standards are employed.

Figure 10:
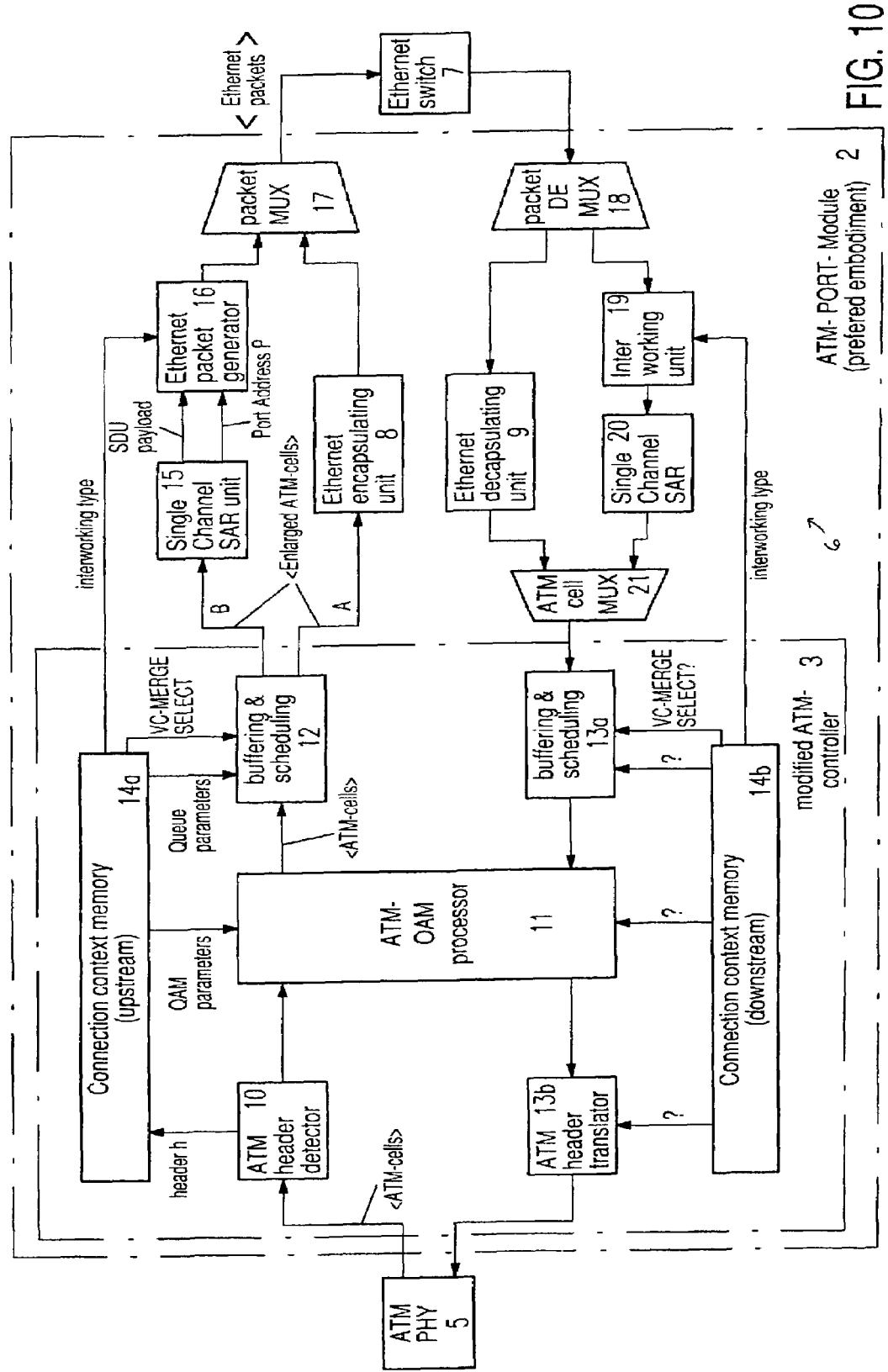
FIG. 10 is a block diagram of a preferred embodiment of the ATM-Port-Module according to the present invention.

FIG. 10 shows a preferred embodiment of an ATM-Port-Module 2 according to the present invention.

The ATM-controller 3 comprises an ATM-to-Ethernet signal path and an Ethernet-to-ATM signal path. The ATM-to-Ethernet signal path includes an ATM-header detector unit 10, an ATM-OAM-processor 11, and a buffering and scheduling unit 12.

The Ethernet-to-ATM signal path comprises a buffering and scheduling unit 13a, the ATM-OAM-processor 11, and an ATM-header translator 13b.

The ATM-to-Ethernet signal path 10, 11, 12 and the Ethernet to ATM-signal path are controlled by output signals from a connection context memory 14.

Figure 11:
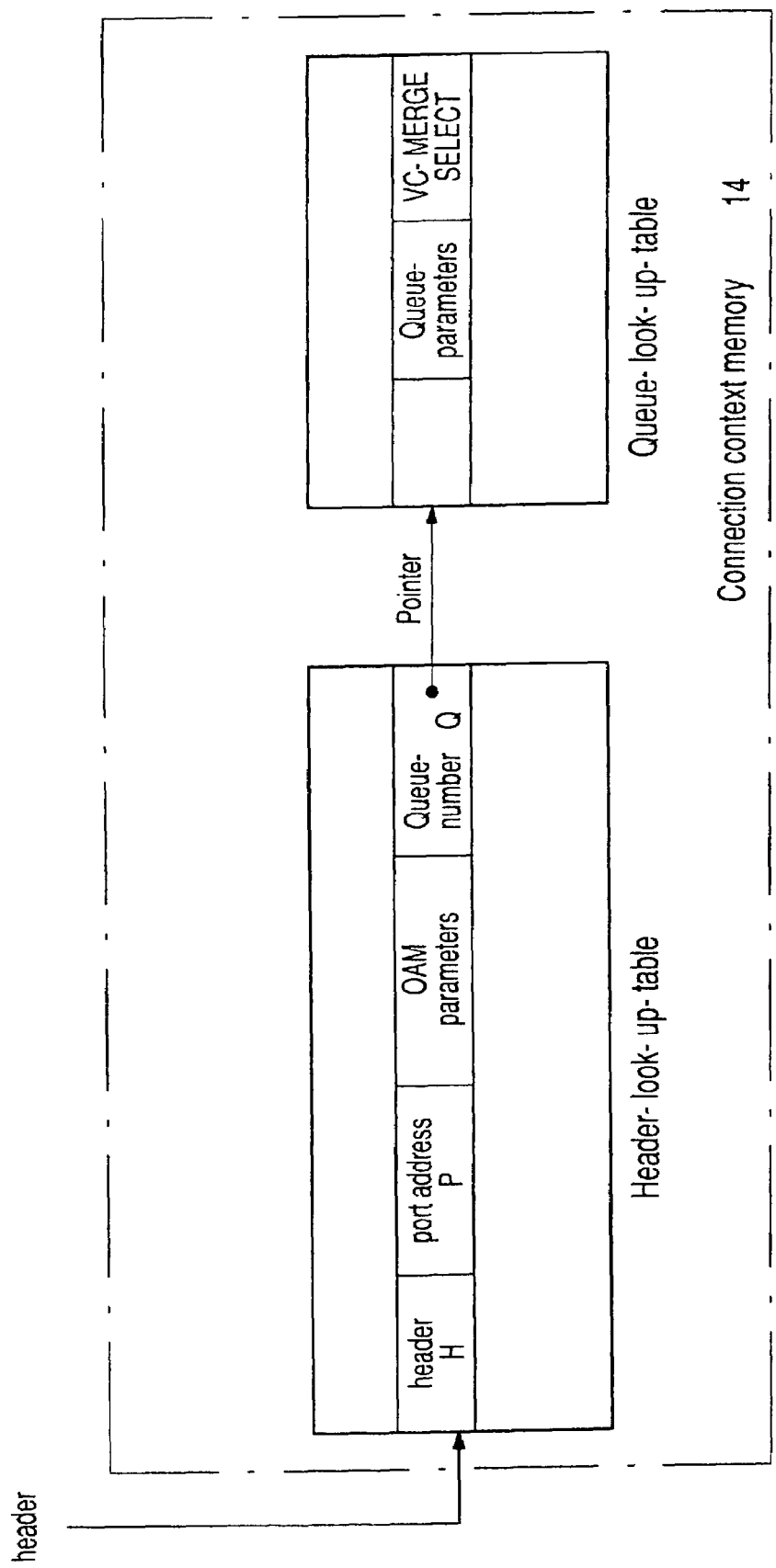
FIG. 11 shows the content of a connection context memory according to the present invention.

FIG. 11 shows the data content of the connection context memory 14 according to a preferred embodiment of the present invention. The ATM-header detector unit 10 detects the headers of ATM-cells received via at least one transmission line 5. With the detected header, the memory entry of the header look up table in the connection context memory 14 is addressed. In each header, the port-address P, OAM-parameters and a queue number Q are stored. The ATM-header detector 10 notes the recognition of valid cell headers, i.e. with pre-defined VPI/VCI values. The port-address P within the header lookup table is either the Ethernet DMAC-address of the destination ATM-Port-Module 2 or a binary encoded number that is converted to the DMAC-address according to a configuration table of the connection context memory 14.

The OAM-parameters define operation and maintenance functions such as a loopback, performance monitoring and alarming and are supplied by the connection context memory 14 to the ATM-OAM-processor 11.

The queue number Q within the header lookup table serves as a pointer to a corresponding memory entry in the queue lookup table of the connection context memory 14. Queuing parameters are provided for the scheduling devices 12, 13.

In the ATM-Port-Module 2 according to the preferred embodiment as shown in FIG. 10, the queue lookup table comprises an indication flag (VC-MERGE-SELECT) for each data queue. The VC-MERGE-SELECT bit is supplied to the scheduling devices 12, 13 and, if set, ensures an alignment of all cells belonging to a packet.

The indication flag (VC-MERGE-SELECT) indicates whether the destination port of the received ATM-cell is an ATM-Port connected to an ATM-Port-Module (2-i) within the ATM-node device 1 or an Ethernet-Port of the Ethernet switch core module 7 within the ATM-node device 1.

When the indication flag (VC-MERGE-SELECT) indicates an ATM-Port as the destination port, the enlarged ATM-cells are output by the scheduling unit 12 to the Ethernet encapsulating unit 8.

In contrast, when the indication flag (VC-MERGE-SELECT) indicates an Ethernet-Port of the ATM Node as the destination port the enlarged ATM-cells processed by the ATM-OAM-processor 11 are forwarded to a Segmentation and Re-assembly unit 15. The Segmentation and Re-assembly unit 15 discards the ATM-headers of the enlarged ATM-cells and forwards the payload of the enlarged ATM-cells to an Ethernet packet generator 16, which generates an Ethernet packet containing at least one discarded ATM-cell as payload.

The VC-MERGE function forms an alignment of all ATM-cells belonging to a packet. This is possible because of the last-cell-of-packet indication bit in the ATM-header of AAL5 carrying cells. Queues in which the VC-Merge Select bit is not set are treated by the scheduling device 12 as "normal" ATM-cell queues to ATM-destinations. These queues are switched to the SAR-unit 15.

In contrast, data queues having the VC-merge-select bit set as an indication flag are served in a packet-aware mode, i.e. the data queue is served until all cells of a packet are read out and the last cell of the packet is transmitted. Then the control is transferred to the next prioritized queue.

Figure 12:
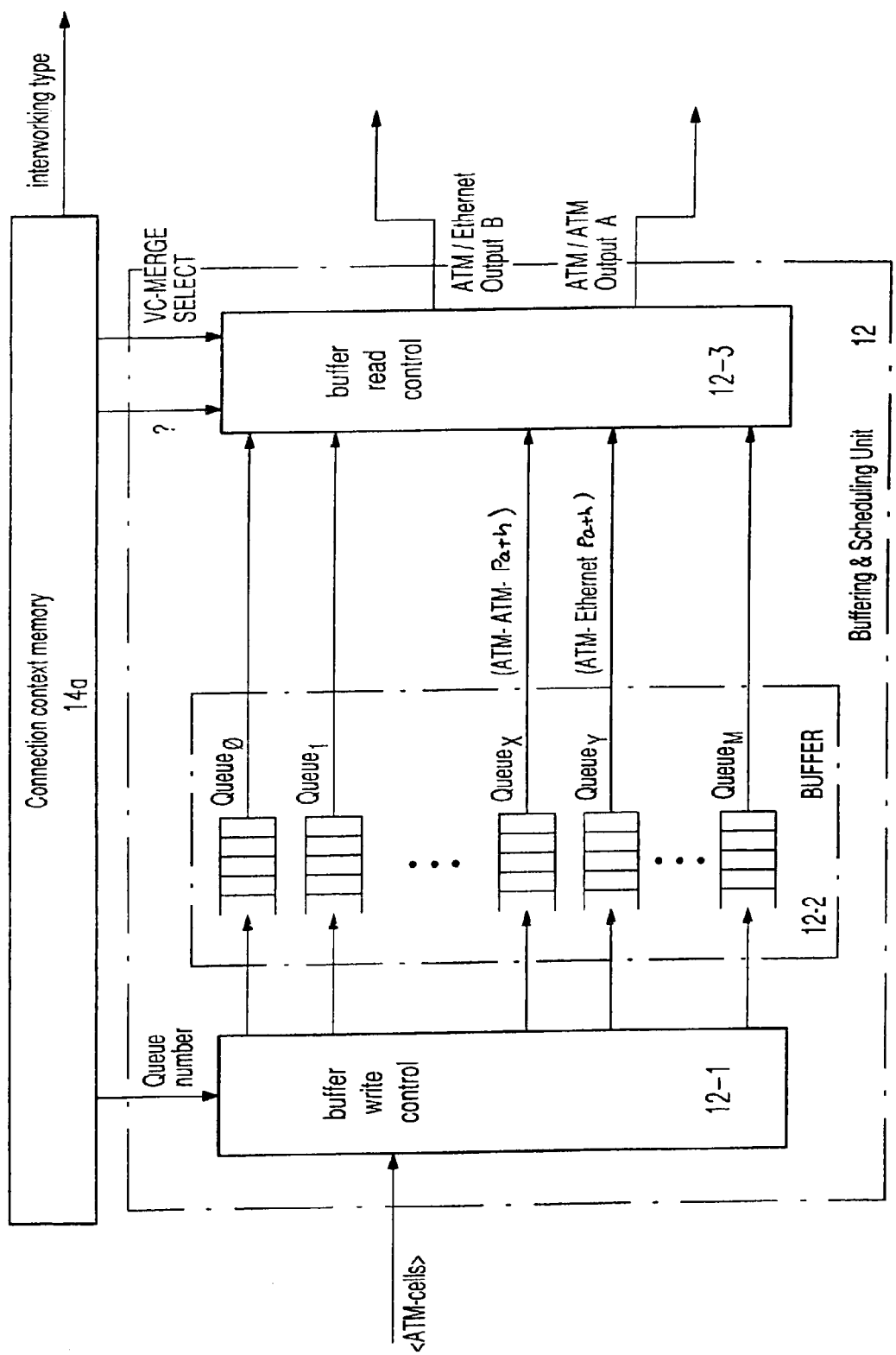
FIG. 12 shows a buffering and scheduling unit within an ATM-Port-Module according to the present invention.

FIG. 12 shows a buffering and scheduling unit 12 according to the present invention. The buffering and scheduling unit 12 comprises a buffer write control 12-1, a buffer 12-2 and a buffer read control 12-3. The buffer write control 12-1 distributes the incoming ATM-cells into different queues within the buffer 12-2. In the example shown in FIG. 12, the queue x is a data queue for an ATM-to-ATM signal path and the queue y is a data queue for an ATM-to-Ethernet signal path.

In the queue lookup table as shown in FIG. 11, the queue x will have the VC-MERGE-SELECT bit not set, whereas the queue y will have the VC-MERGE-SELECT bit set to indicate that queue y is a data queue with an Ethernet-Port as its destination.

When the buffer read control 12-3 processes queue x, it detects that the VC-MERGE-SELECT indication bit is not set and forwards an ATM cell to the Ethernet encapsulation unit 8.

In contrast, when the buffer read control detects that the VC-MERGE-SELECT bit is set (for example for data queue y), the ATM-cell is forwarded to a single channel Re-assembly unit 15 (SAR) in a packet aware mode. In this case, the data queue y is served continuously by the buffer read controller 12-3 until all ATM-cells belonging to a packet in the data queue y are read out and the last ATM-cell is transmitted to the SAR-unit 15. The last-cell-of-packet-indication-bit in the header of the last ATM-cell informs the buffer read control 12-3 that the complete packet has been forwarded and the next queue can be processed.

Figure 13:
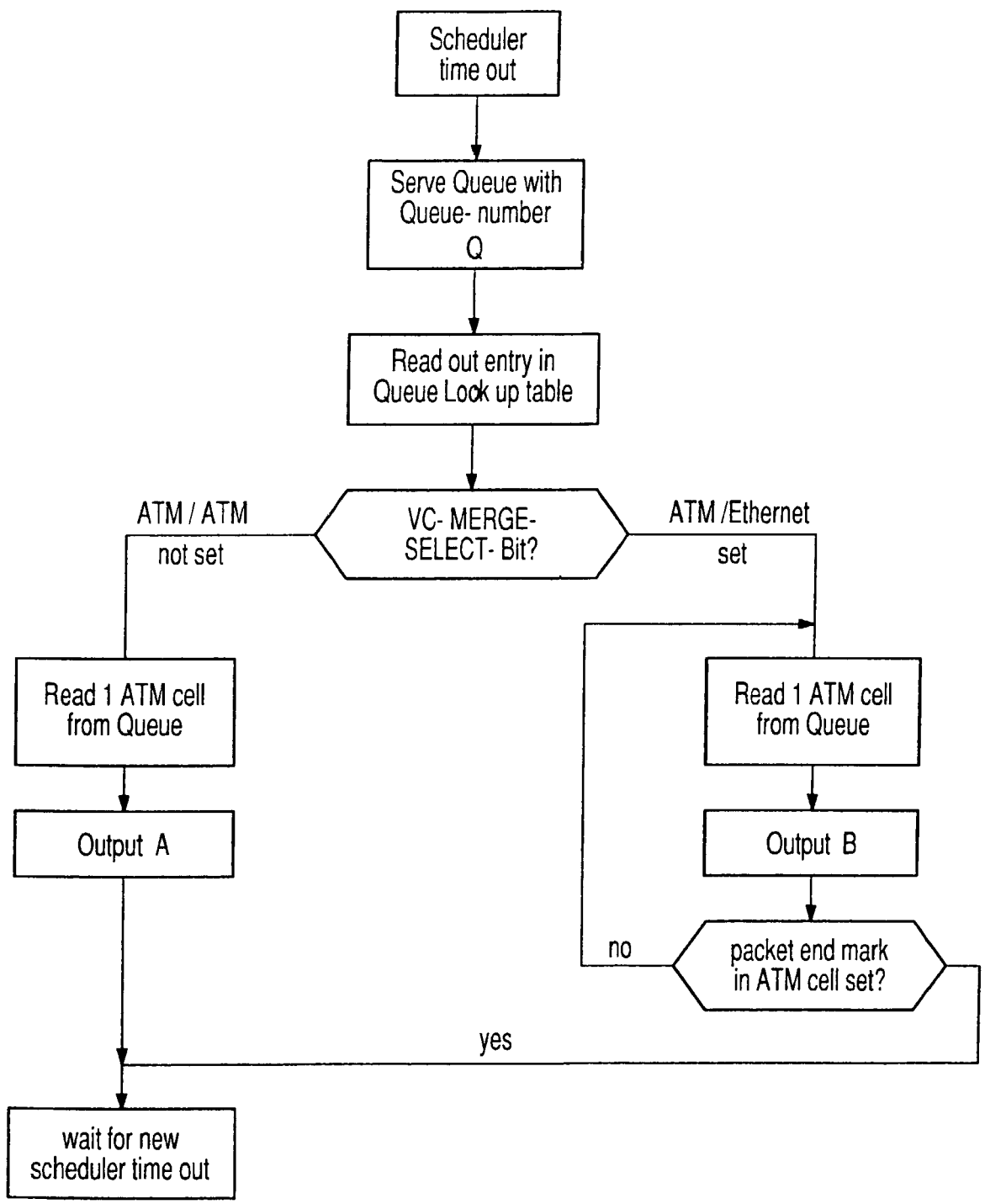
FIG. 13 is a buffer-read control flowchart according to a preferred embodiment of the present invention.

FIG. 13 shows the flow chart of a buffer read control performed by the buffer read control unit 12-3 in the scheduling unit 12. After the scheduler timeout, the buffer read control 12-3 serves the queue with the number Q supplied from the connection context memory 14. The queue number Q is read out from the queue look up table within the connection context memory 14.

In a next step, the buffer read control 12-3 checks whether the VC-MERGE-SELECT bit is set or not. If the VC-MERGE-SELECT bit is not set, the buffer read control 12-3 recognizes that the ATM-cells are destined for an ATM-port. In this case an ATM-cell is read from the addressed queue and output to the Ethernet encapsulating unit 8. Then, the buffer read control 12-3 waits for the next scheduler timeout.

If the buffer read control 12-3 recognizes that the VC-MERGE-SELECT bit is set, it recognizes that the ATM-cells are destined for an Ethernet-Port. In this case an ATM-cell is read from the queue and transmitted to the single channel Re-assembly unit 15. The packet end mark in the ATM-cell which is read from the queue is checked to determine whether it is set or not. If the mark is not set, the next ATM-cell is read from the applied queue and forwarded through the SAR-unit for merging.

The Ethernet packet generated by the Ethernet packet generator 16 or the Ethernet encapsulating unit 8 is transmitted via a packet multiplexer 17 to the Ethernet switch 7.

The Ethernet packets received from the Ethernet switch 7 are de-multiplexed by a packet de-multiplexer 18 to an Ethernet decapsulating unit 9 or an interworking unit 19, depending on the different DMAC address or alternatively on the contents of the Type field. On the output side of the interworking unit 19, a single channel segmentation unit 20 is provided. The single channel segmentation unit 12 and Ethernet decapsulating unit 9 are connected via an the ATM-cell multiplexer 21 to the ATM-controller 3.

Figure 14:
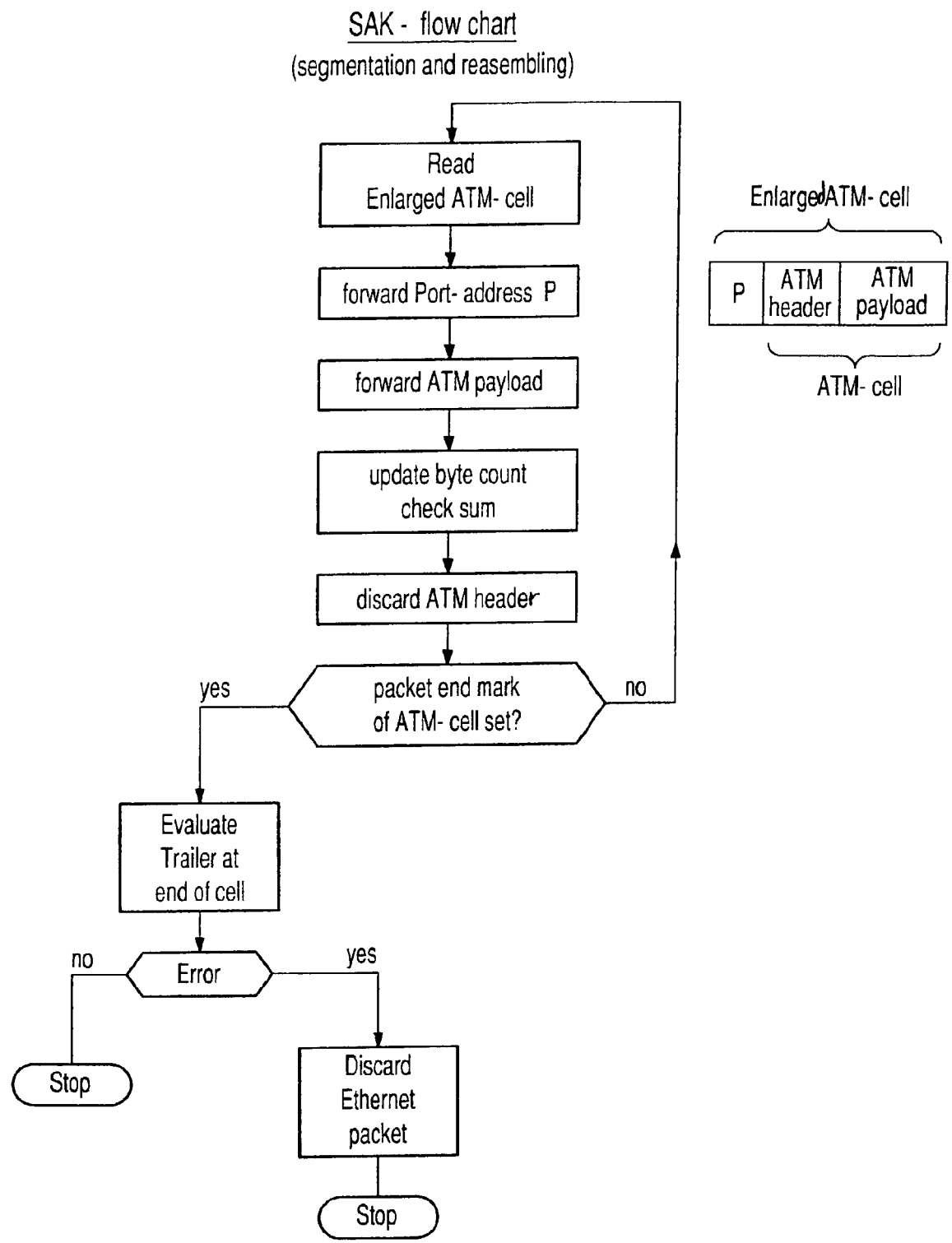
FIG. 14 is an SAR-flowchart according to the present invention.

FIG. 14 shows the Re-assembling process within the SAR-unit 15. The SAR-unit 15 receives an enlarged ATM-cell from the buffering and scheduling unit 12. The port address P and the ATM-payload of the received enlarged ATM-cell are forwarded to the Ethernet packet generator 16.

After a byte count update and a check sum update, the ATM-header of the received enlarged ATM-cell is discarded by the SAR-unit 15.

A further step checks whether the packet end mark of the received ATM-cell is set or not. If the packet end mark is set, the trailer at the end of the cell is evaluated and is checked to determine whether an error has occurred or not. In the error case, the complete Ethernet packet is discarded. If no error has occurred, the AAL5 SDU-payload is forwarded to the Ethernet packet generator 16.

The Ethernet packet generator 16 generates an Ethernet packet depending on interworking type data read from the connection context memory 14. The Ethernet packet generator 16 performs the conversion between AAL5-SDU and Ethernet packets. For this conversion several operation modes are possible.

Figure 15:
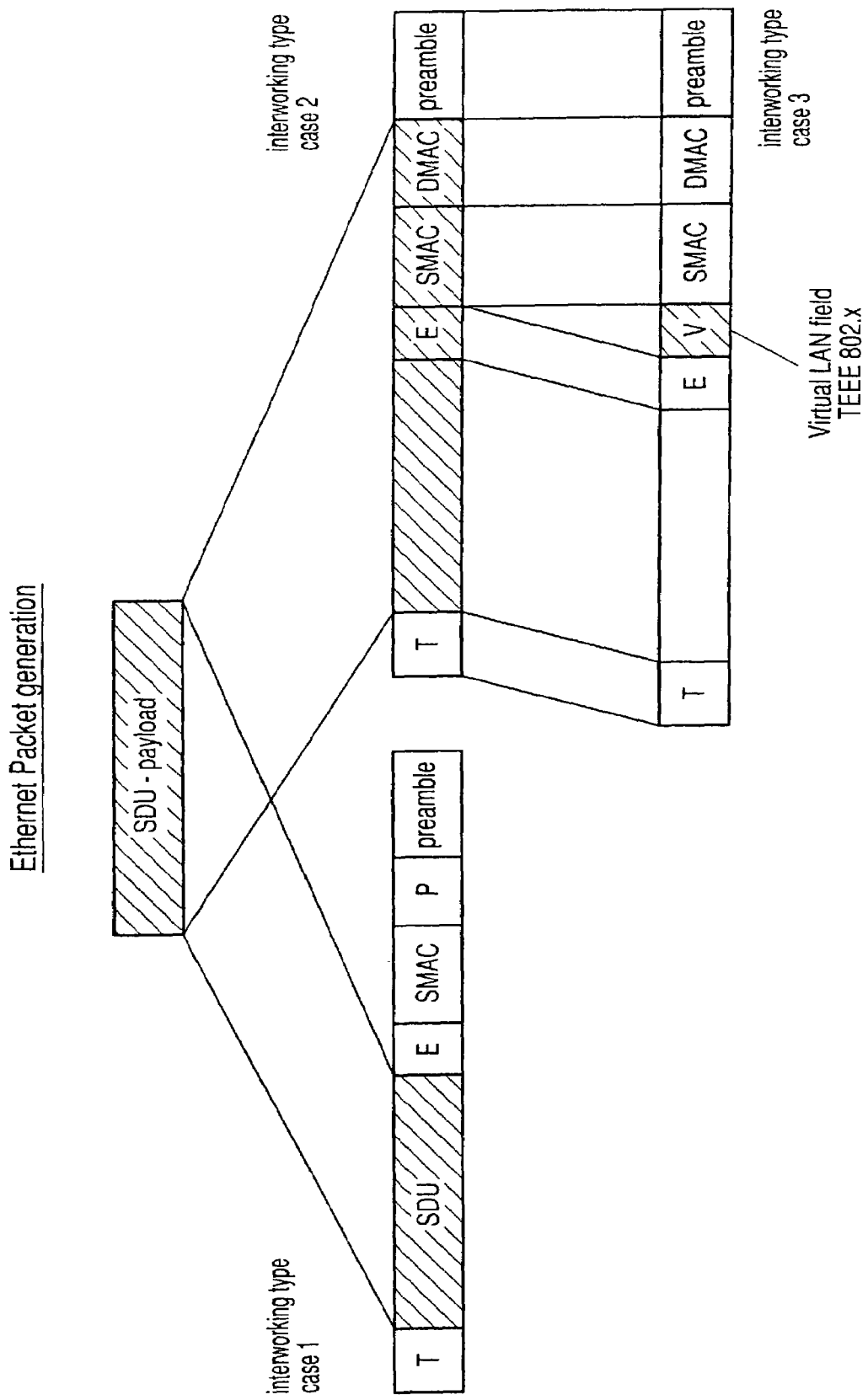
FIG. 15 shows basis structures for explaining the Ethernet packet generation according to the present invention.

FIG. 15 shows, for example, three different interworking cases for conversion.

In the interworking case 1, the AAL5-SDU is packed transparently into an Ethernet packet with a new generated header and trailer.

In the interworking case 2, the AAL5-SDU is already an Ethernet packet with DMAC, SMAC and Ethertype fields. Before transmission, it is prepended by the Ethernet preamble and the Ethernet trailer T is appended.

In the interworking type case 3, in both cases, an additional VLAN field can be inserted between the standard Ethernet header and the payload. VLANs can be used to limit the broadcast domains and to separate the ports from each other.

The interworking type case 1 shown in FIG. 15 can also be referred to as the routing case, and the interworking type case 2 shown in FIG. 15 can also be referred to as the bridging case.

Figure 16:
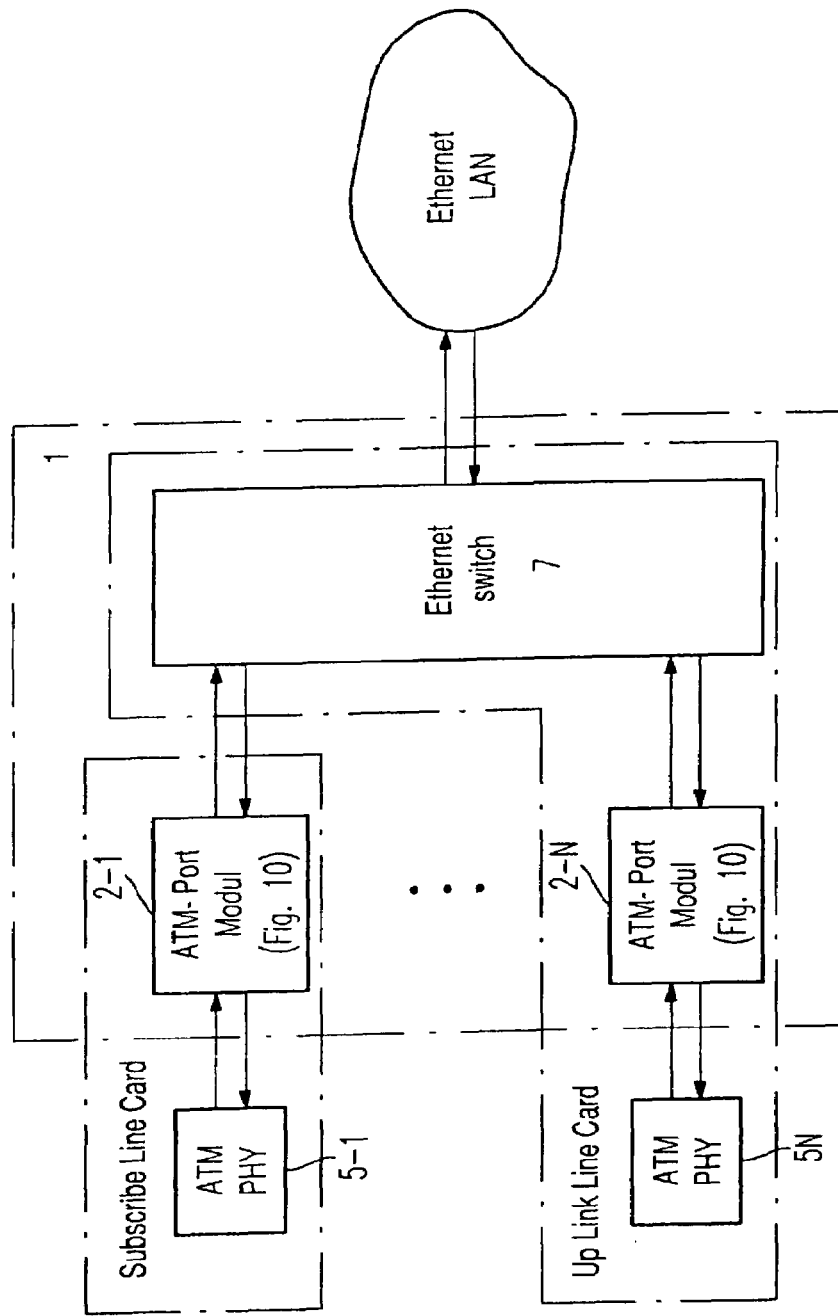
FIG. 16 shows an application of the ATM-Port-Module within an ATM-Ethernet-DSLAM.

FIG. 16 shows a typical application of the ATM-node 1 according to the present invention. In case of a DSLAM, a Utopia level 2 interface can support a large number of xDSL physical transmission lines 5, e.g. 64 ADSL (with dual latency) or 128 SHDSL or 32 VDSL physical transmission lines. A Mixed ATM-Ethernet interworking DSLAM is shown in FIG. 16. Such a DSLAM consists of typically 16 to 20 subscriber line cards, an ATM up-link card, and an Ethernet uplink card. Each subscriber line card contains at least one ATM-Port-Module 2 with several Multi-xDSL physical transmission lines 5 connected to it via a Utopia interface. The ATM uplink card contains at least one SDH transceiver, either STM-1 with 155 Mbps or STM-4 with 622 Mbps.

The Ethernet switch 7 is realized with a single component or cascaded with several components. The core module can be located on the uplink line card or on a separate switching card.

The ATM-Ethernet node according to the present invention performs an ATM-to-Ethernet interworking function. The interworking function is possible in cases when the ATM-cells are AAL5 encoded packets. The AAL5 standard is defined in ITU-T I.363.5 recommendation. The AAL5 functionality is implemented by enlarging conventional ATM-Port-Modules. The ATM-controller 3 is enhanced by the so called VC-MERGE function, and the Ethernet switch interface is extended by the single channel SAR-unit 15 between the ATM-controller 3 and the Ethernet packet generator 16. The connection context memory 14 stores for this scope a VC-MERGE-SELECT indication flag and interworking type data comprising, for instance, 4 bits for coding up to 16 inter-working types.

The invention claimed is:

1. An ATM-port module for an ATM-node having an Ethernet switch, the ATM-port module comprising:
   an ATM-controller;
   an Ethernet-switch interface connecting the ATM-controller to the Ethernet switch, the Ethernet-switch interface having an Ethernet encapsulating-unit for encapsulating ATM cells processed by the ATM-controller into Ethernet packets for transmission to the Ethernet switch, and an Ethernet decapsulating-unit for extracting ATM cells from Ethernet packets received from the Ethernet switch,
   a segmentation-and-reassembly unit; and
   a buffering-and-scheduling unit for
   providing a processed enlarged-ATM-cell, the processed enlarged-ATM-cell including destination information, to the Ethernet encapsulating-unit when an indication flag indicates that an ATM port is a destination port of the enlarged ATM-cell; and
   providing the processed enlarged-ATM-cell to the segmentation-and-reassembly unit when the indication flag indicates that an Ethernet port is the destination port of the enlarged ATM-cell.

2. The ATM-port module of claim 1, wherein the ATM controller comprises:
   an ATM-to-Ethernet signal path, and
   an Ethernet-to-ATM signal path.

3. The ATM-port module of claim 2, wherein the ATM-to-Ethernet signal path comprises:
   an ATM-header detector unit for detecting headers of received ATM cells;
   an ATM-OAM-processor for performing operation and maintenance functions depending on OAM parameters read from a queue look-up-table of the memory,
   a buffering-and-scheduling unit for buffering and scheduling the processed ATM-cells and for generating enlarged ATM-cells, each of which includes a port address of the ATM node, the port address being read from a memory.

4. The ATM-port module of claim 3, wherein the Ethernet-to-ATM-signal-path of the ATM controller comprises:
   a buffering-and-scheduling unit for buffering and scheduling ATM cells received from the Ethernet-switch interface;
   an ATM-OAM-processor for performing operation and maintenance functions depending on OAM-parameters read from a memory;
   an ATM-header translator.

5. The ATM-port module of claim 1, wherein the ATM-controller comprises a memory for storing:
   a header look-up-table; and
   a queue look-up-table.

6. The ATM-port module of claim 5, wherein the header look-up-table is configured to store, for each detected ATM-cell header:
   a corresponding port-address of a destination port of the ATM node;
   OAM parameters; and
   a queue number.

7. The ATM-port module of claim 6, wherein the queue number comprises a pointer to a corresponding entry in the queue look-up-table.

8. The ATM-port module of claim 6, wherein the queue look-up-table is configured to store, for each queue number:
   corresponding queue parameters; and
   an indication flag indicative of a destination port of a received ATM cell.

9. The ATM-port module according to claim 8, wherein the indication flag is indicative of whether the destination port is an ATM port or an Ethernet port.

10. The ATM-port module according to claim 1,
    wherein the segmentation-and-reassembly unit is configured to discard an ATM header of an enlarged ATM-cell; and
    the ATM-port module further comprises an Ethernet-packet generator for receiving a payload of the enlarged ATM-cell that includes at least one ATM cell.

11. The ATM-port module according to claim 10, wherein the Ethernet-packet generator is configured to:
    read interworking-type data from a memory, and to
    generate an Ethernet packet on the basis of the interworking-type data.

12. An ATM-port module for an ATM-node having an Ethernet switch, the ATM-port module comprising:
    an ATM-controller;
    an Ethernet-switch interface connecting the ATM-controller to the Ethernet switch;
    a memory for storing a header look-up-table, and a queue look-up-table; and
    a buffering-and-scheduling unit for
    providing a processed enlarged-ATM-cell, the processed enlarged-ATM-cell including a destination port address, to the Ethernet encapsulating-unit when an indication flag indicates that an ATM port is a destination port of the enlarged ATM-cell; and
    providing the processed enlarged-ATM-cell to the segmentation-and-reassembly unit when the indication flag indicates that an Ethernet port is the destination port of the enlarged ATM-cell;
    wherein the header look-up-table is configured to store, for each detected ATM-cell header, a corresponding port-address of a destination port of the ATM node, OAM parameters, and a queue number that includes a pointer to a corresponding entry in the queue look-up-table; and
    wherein the queue look-up-table is configured to store, for each queue number: corresponding queue parameters; and an indication flag indicative of a destination port of a received ATM cell.

13. The ATM-port module of claim 12, wherein the Ethernet-switch interface comprises:
    an Ethernet encapsulating-unit for encapsulating ATM cells processed by the ATM-controller into Ethernet packets for transmission to the Ethernet switch, and
    an Ethernet decapsulating-unit for extracting ATM cells from Ethernet packets received from the Ethernet switch.

14. The ATM-port module according to claim 13, further comprising:
    a segmentation-and-reassembly unit.

15. The ATM-port module of claim 12, wherein the ATM controller comprises:
    an ATM-to-Ethernet signal path, and
    an Ethernet-to-ATM signal path.

16. The ATM-port module of claim 15, wherein the ATM-to-Ethernet signal path comprises:
    an ATM-header detector unit for detecting headers of received ATM cells;
    an ATM-OAM-processor for performing operation and maintenance functions depending on OAM parameters read from a queue look-up-table of the memory, a buffering-and-scheduling unit for buffering and scheduling the processed ATM-cells and for generating enlarged ATM-cells, each of which includes a port address of the ATM node, the port address being read from a memory.

17. The ATM-port module of claim 15, wherein the Ethernet-to-ATM-signal-path of the ATM controller comprises:
a buffering-and-scheduling unit for buffering and scheduling ATM cells received from the Ethernet-switch interface;
an ATM-OAM-processor for performing operation and maintenance functions depending on OAM-parameters read from the memory;
an ATM-header translator.

18. The ATM-port module according to claim 12, wherein the indication flag is indicative of whether the destination port is an ATM port or an Ethernet port.

19. The ATM-port module according to claim 12, wherein a segmentation-and-reassembly unit is configured to discard an ATM header of an enlarged ATM-cell; and the ATM-port module further comprises an Ethernet-packet generator for receiving a payload of the enlarged ATM-cell that includes at least one ATM cell.

20. The ATM-port module according to claim 19, wherein the Ethernet-packet generator is configured to:
read interworking-type data from the memory, and to
generate an Ethernet packet on the basis of the interworking-type data.

* * * * *